W. H. THIEMER.
UNIVERSAL JOINT.
APPLICATION FILED FEB. 24, 1919.
1,360,818.
Patented Nov. 30, 1920.
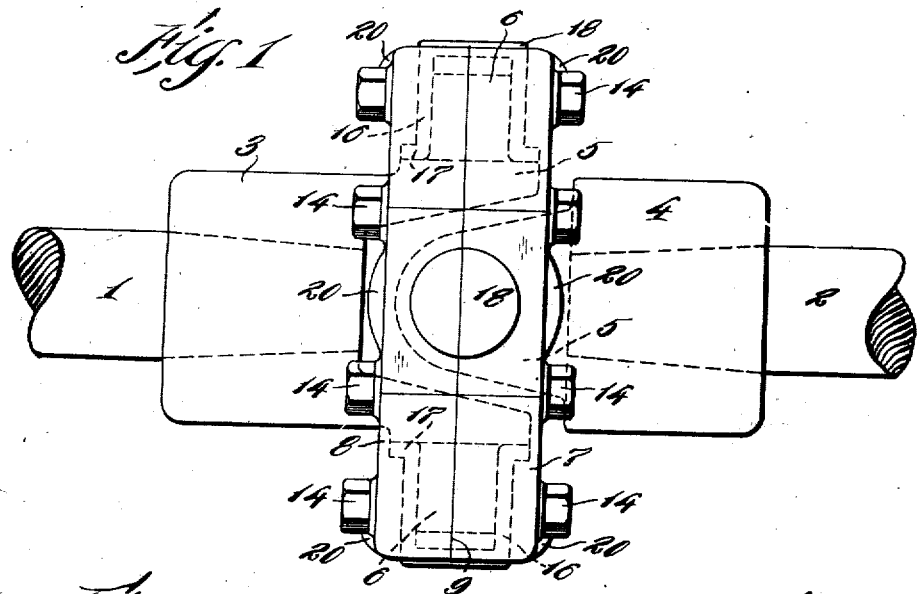

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,360,818.  Specification of Letters Patent.  Patented Nov. 30, 1920.

Application filed February 24, 1919. Serial No. 278,709.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and has for its general object to provide a construction which will permit of ease of assembling the parts thereof, and secure efficient and economical lubrication of the bearings for the trunnions, the invention being particularly designed with reference to the ring type of connection between the opposed shaft sections.

In the drawings forming part hereof, Figure 1 represents a side elevation of a universal joint constructed in accordance with my invention; Fig. 2 a view, partly in plan and partly in section, of such joint, one of the shaft sections and its trunnions being omitted; and Fig. 3 a sectional view through the ring corresponding to the line 3—3 of Fig. 2, the trunnions and one of the bushings being omitted.

Describing the various parts by reference characters. 1 and 2 denote shaft sections, provided respectively with the hubs 3 and 4, each hub being forked as shown at 5 in full lines on Fig. 2 and in dotted lines on Fig. 1; and each of the forks or branches being provided with a trunnion 6, shown in like manner in such views.

The shaft sections are connected, through their hubs and trunnions, by means of a two-part ring, the sections or members of said ring being indicated respectively at 7 and 8. One of these sections, as 7, will be provided with a flange 9 at the peripheral portion, which faces the other section, and the other section will have a flange or shoulder 10, within the periphery thereof and facing the first mentioned section, the two flanges providing a rabbeted annular seat 12 for the flange 9 outside the flange 10.

Each ring section is provided with four half-journal bearings 13 adapted, when the sections are clamped together as by the bolts 14, to provide complete cylindrical journal bearings. The hollow interior of the ring, provided by assembling the two sections, contains an annular space for lubricant, indicated at 15.

Each journal bearing 13 is adapted to receive therewithin a bushing, indicated at 16, the bushings being provided each with a flange 17 at one end adapted to abut against a shoulder on a yoke 5 and having its opposite end closed by a cap 18. Each bushing is shown as provided with diametrically opposed ports 19 adapted to register through ports 13ª in the journals with the lubricant chamber 15 within the ring.

In assembling the joint, the bushings will be applied to their trunnions, the parts being so proportioned that the ports 19 will be located, in part at least, beyond the outer ends of the trunnions, to provide a lubricant well in each bushing beyond the outer end of a trunnion, which well is in communication with the large lubricant well or chamber 15 in the body of the ring. The sections will then be applied to the trunnions and bushings and secured by the bolts 14.

In order to permit of the free distribution of lubricant throughout the entire ring channel or chamber 15, each ring section is offset from the journals 13, as shown at 20, whereby, when the joint is being rotated, the lubricant may flow by centrifugal action from one part of the annular chamber to another through the journal bearings, by the parts 13ª and 19ª and around the journal bearings by the parts 20ª.

For the purpose of filling the ring with lubricant, an opening communicating with the chamber 15 therein is provided, said opening being shown as closed by a plug 21.

To facilitate the distribution of lubricant between the trunnions 6 and the bushings 16, one or more channels may be provided between each trunnion and its bushing, as by filing or otherwise flattening the surface of each trunnion, as indicated at 22.

For the purpose of retaining the bushings with their ports 19 in operative relation to the ports 13ª in the journal bearings, each bearing is shown as provided with a dowel pin 23 adapted to enter an aperture 24 in a bushing.

Having thus described my invention, what I claim is:—

1. In a universal joint, the combination of a pair of shaft sections each having trunnions, a ring provided with open-ended bearings for said trunnions and having an annular lubricant chamber therewithin, and a bushing for each trunnion mounted within a bearing, each bushing having its outer end closed and there being a well provided between the end of each trunnion and the outer end of its bushing, the said well being in communication with the lubricant chamber within said ring.

2. In a universal joint, the combination of a pair of shaft sections each having trunnions, a ring provided with bearings for said trunnions and having an annular lubricant chamber therewithin adapted to permit lubricant to flow around said bearings, a bushing for each trunnion having its outer end closed and each mounted within a bearing, said bushings each being in communication with the lubricant chamber within said ring beyond the end of the trunnion therewithin.

3. In a universal joint, the combination of a pair of shaft sections each having trunnions projecting therefrom, a hollow chambered ring having bearings for said trunnions, means providing for each trunnion and within its bearing a well extending beyond the outer end thereof and communicating with the chamber provided within the interior of the ring on opposite sides thereof, means for introducing lubricant into the interior of said ring, and a port or passageway extending around each bearing and placing the portions of the ring chamber in communication with one another.

4. In a universal joint, the combination of a pair of shaft sections each having trunnions projecting therefrom, a bushing for each trunnion extending beyond the outer end of each trunnion and providing a chamber beyond such end and having ports on the opposite sides thereof, a hollow ring having bearings for said bushings, the said bearings being provided with ports adapted to communicate with the bushing ports, ports extending about each bearing and on opposite sides thereof and communicating with the interior of said ring, and means for introducing lubricant into the said ring.

5. In a universal joint, the combination of a pair of shaft sections each having trunnions projecting therefrom, a two-part hollow ring having bearings for said trunnions, one of the sections of said ring having a flange adapted to seat against a coöperating surface of the other section of said ring, thereby to form a liquid-tight joint, means whereby lubricant may be introduced into the interior of said ring, and means for supplying lubricant from the interior of said ring to the said bearings.

6. In a universal joint, the combination of a pair of shaft sections each having trunnions projecting therefrom, a two-part hollow ring having bearings for said trunnions; one of the sections of said ring having a peripheral flange and the other section of said ring having a peripheral seat for said flange and a flange within such seat, thereby to form a liquid-tight joint between said sections, means whereby lubricant may be introduced into the interior of said ring, and means for supplying lubricant from the interior of said ring to and about the said bearings.

In testimony whereof I hereunto affix my signature.

WILLIAM H. THIEMER.